(12) United States Patent
Komoriya

(10) Patent No.: US 6,754,996 B2
(45) Date of Patent: Jun. 29, 2004

(54) INTERIOR DECORATIVE MATERIAL HAVING A TATAMI FACING

(76) Inventor: Shigeru Komoriya, c/o Komoriya Shoten Co., Ltd. 28-8, Sasazuka 3-chome, Shibuya-ku, Tokyo (JP), 151-0073

( * ) Notice: Subject to any disclaimer, the term of this patent is extended or adjusted under 35 U.S.C. 154(b) by 0 days.

(21) Appl. No.: 09/919,948

(22) Filed: Aug. 2, 2001

(65) Prior Publication Data

US 2002/0094408 A1 Jul. 18, 2002

Related U.S. Application Data

(63) Continuation-in-part of application No. PCT/JP00/00463, filed on Jan. 28, 2000, which is a continuation-in-part of application No. PCT/JP00/03726, filed on Jun. 8, 2000.

(30) Foreign Application Priority Data

| Feb. 3, 1999 | (JP) | 11-062105 |
| Jun. 14, 1999 | (JP) | 11-202089 |
| Jun. 14, 1999 | (JP) | 11-202091 |

(51) Int. Cl.⁷ ............................................. E04F 15/02
(52) U.S. Cl. .................... 52/177; 52/309.8; 52/309.14; 52/800.1; 52/782.1
(58) Field of Search ............... 52/390, 177, 309.8, 52/309.14, 800.1, 794.1, 782.1; 428/82

(56) References Cited

U.S. PATENT DOCUMENTS

| 4,948,116 A | * | 8/1990 | Vaux | 472/92 |
| 6,037,033 A | * | 3/2000 | Hunter | 428/72 |
| 2001/0034983 A1 | * | 11/2001 | Fanti | 52/177 |

FOREIGN PATENT DOCUMENTS

| JP | 39-37704 U | | 12/1964 | |
| JP | 59-32046 U | | 2/1984 | |
| JP | 59-125947 A | | 7/1984 | |
| JP | 1-151647 A | | 6/1989 | |
| JP | 3-55355 | * | 3/1991 | E04F/15/02 |
| JP | 3-273034 | * | 12/1991 | C08J/9/12 |
| JP | 4-2830 U | | 1/1992 | |
| JP | 6-288063 | * | 10/1994 | E04F/15/02 |
| JP | 7-82862 A | | 3/1995 | |
| JP | 7-109815 A | | 4/1995 | |
| JP | 9-78808 | * | 3/1997 | E04F/15/02 |
| JP | 9-137585 A | | 5/1997 | |
| JP | 10-183955 | * | 7/1998 | E04F/15/02 |
| JP | 10-196091 A | | 7/1998 | |
| JP | 10-311131 A | | 11/1998 | |
| JP | 11-100979 A | | 4/1999 | |
| JP | 11-350712 | * | 12/1999 | E04F/15/02 |
| JP | 2000-17819 | * | 1/2000 | E04F/15/02 |

* cited by examiner

*Primary Examiner*—Brian E. Glessner
(74) *Attorney, Agent, or Firm*—Smith Patent Office

(57) ABSTRACT

A tiling tatami panel suitable for tiling comprises a base member easy to cut and a facing on the base member, and preferably has a 300 to 750 mm square size in its plan view. The facing is made of natural or synthetic-resin rushes of wooden fibers. The base material is composed of an upper layer of composite foam of calcium carbonate and polyethylene or polyolefin, or felt, and stacked on a main layer of natural or synthetic rubber. The tiling tatami panel has chamfered borders, and peripheral surfaces of the tiling tatami panel including the chamfered borders are covered with a protective film.

11 Claims, 8 Drawing Sheets

INTERIOR DECORATIVE MATERIAL HAVING A TATAMI FACING

CROSS REFERENCE TO RELATED APPLICATIONS

This is a continuation-in-part of International Application No. PCT/JP00/00463 with an international filing date of Jan. 28, 2000, now pending, and a continuation-in-part of International Application No. PCT/JP00/03726 with an international filing date of Jun. 8, 2000, now pending.

BACKGROUND OF THE INVENTION

1. Field of the Invention

This invention generally relates to an interior decorative material having tatami facing, and more particularly, to a thin tatami mat and a tiling tatami panel.

2. Discussion of the Related Art

Tatami mats have been traditionally used as flooring of Japanese-style houses and buildings. Recently, however, various ways of use of tatami mats have been proposed, such as laying one or more tatami mats on a limited area of a floor of a Western-style room instead of a carpet. Traditional tatami mats are made up of a mat bed made of straws, a facing made of mat rushes, which is placed on and stitched together with the mat bed, and edge-covering strips extending on and along opposite side borders of the facing and stitched together to the mat bed.

Under the circumstances, tatami mats using a synthetic resin material such as polypropylene as the facing in lieu of mat rushes (see Japanese Patent Laid-Open Publication No. 9(1997)-60260) and those mainly using foam such as polystyrene foam as the mat bed in lieu of straws (see Japanese Patent Laid-Open Publication No. 7(1995)-189463 and Japanese Patent Laid-Open Publication No. 8(1996)-151774) have got to be used widely. In addition, although traditional tatami mats have edge-covering strips stitched beforehand along opposite side borders thereof, those without edge-covering strips, to be applied with such edge-covering strips after the tatami mat or mats are arranged in position, have been brought into market (see Japanese Patent Laid-Open Publication No. 9(1997)-195485).

Thus, tatami mats have been changed variously in way of use and material, and stripless tatami mats have also appeared. However, there is no substantial change in technique for fabricating tatami mats, and a method relying on craftsman's skill is still used.

The traditional technique of fabricating a traditional stripless tatami mat will be explained below following its steps.

(1) A facing is laid over a mat bed;

(2) opposite end border portions of the facing are folded down to the bottom of the bed mat, wrapping the associated ends of the mat bed, each end border of the facing extending substantially in parallel with rushes composing the facing;

(3) opposite side border portions of the facing are cut away along the corresponding side borders of the mat bed, each side border extending along aligned ends of the rushes of the facing;

(4) each edge-covering strip is placed inside out on the facing along but slightly inside each side border of the facing and the edge-covering strip is stitched to the mat bed through the facing; and (5) each edge-covering strip is raised along the seam and folded back to the bottom of the mat bed to lie on the corresponding side periphery of the mat bed, and stitched again to the side periphery.

A method of fabricating the tatami mat disclosed in Japanese Laid-Open Publication No. 9(1997)-195485, already introduced, is essentially the same as that of the traditional tatami mat, except for the steps of stitching each edge-covering strip of the above-mentioned manufacturing method of the traditional tatami mat. That is, (1) a facing is laid over the mat bed;

(2) opposite end border portions of the facing are folded down to the bottom of the bed mat, wrapping the longitudinal ends of the mat bed; and (3) opposite side border portions of the facing are folded down to wrap side peripheries of the mat bed and then stitched to the side peripheries.

SUMMARY OF THE INVENTION

It is therefore an object of the invention to provide a thin tatami mat that can be made without the need of craftsman's skill, as well as its manufacturing method.

A further object of the invention is to provide a thin tatami mat that can reduce the manufacturing cost, as well as its manufacturing method.

A still further object of the invention is to provide a thin tatami mat that can be placed in position of a room more easily.

A yet further object of the invention is to provide a stripless thin tatami mat that can be made without the need of craftsman's skill, as well as its manufacturing method.

A yet further object of the invention is to provide a tiling tatami panel having a facing convenient for tiling with the tatami mats.

A yet further object of the invention is to provide a tiling tatami panel having a cushiony resiliency.

A yet further object of the invention is to provide a tiling tatami panel that ensures a user to get an impression of a tatami mat made of natural materials when he/she treads on it.

According to one aspect of the invention, those objects of the invention can be accomplished by providing a thin tatami mat comprising: a mat bed; a facing substantially equal in size to the mat bed and bonded to the top surface of the mat bed; and an edge stabilizing means for stabilizing borders of the facing from deformation.

Thickness of the thin tatami mat according to the invention is typically 5 through 30 mm, more preferably 5 through 20 mm, and most desirably 10 through 20 mm. The edge stabilizing means may be, for example adhesive tape covering borders of the facing and side peripheries of the mat bed. Alternatively, side border portions of the facing may be flattened by hot pressing and the flattened portion or reduced thickness portion may be covered with a protective film. The protective film is preferably formed by coating each border portion of the facing with natural rubber or an adhesive resin material such as latex resin. The protective film may extend from each border of the facing to the corresponding side periphery of the mat bed.

The facing is typically made of natural mat rushes, but other materials such as resin rushes (facing products) or wooden fibers are also acceptable. The mat bed may be made of any material having an appropriate resiliency, such as rubbery substance, foam, felt, or the like. From the standpoint of environmental protection, it is desirable that the tatami mat according to the invention is made of materials generating less toxic products when the tatami mat is incinerated as waste after use. Materials recommended for this purpose are composite foam of calcium carbonate and polyolefin, and felt.

According to another aspect of the invention, those objects are accomplished by providing a manufacturing method of a thin tatami mat having a facing and a mat bed and having thickness in the range from 5 mm to 30 mm, comprising: preparing the mat bed; preparing the facing substantially equal in size to the mat bed; bonding the facing onto the mat bed.

According to another aspect of the invention, those objects are accomplished by providing a tiling tatami panel comprising: a base member; a facing substantially equal in size to the base member and bonded to the top surface of the base member; and an edge stabilizing means for stabilizing borders of the facing from deformation.

The edge stabilizing means may be first chamfering border portions of the facing and thereafter covering the chamfered portions with protective films. Alternatively, the edge stabilizing means may be an adhesive tape covering each border portion of the facing and the corresponding side periphery of the mat bed. Alternatively, the edge stabilizing means may be first flattening each border portion of the facing by hot pressing and thereafter covering each flattened portion with a protective film. Alternatively, the edge-stabilizing means may be whipstitching. In this case, whipstitching may be followed by hot pressing of that portion to flatten it. However, that portion after whipstitching is preferably covered with a protective film.

BRIEF DESCRIPTION OF THE DRAWINGS

FIGS. 13A through 13C are diagrams for explaining a manufacturing method of the hot-pressed facing and the tiling tatami panel using the facing as shown in FIG. 12, in which FIG. 13A is a step of hot-pressing the facing, FIG. 13B shows a step of bonding the facing with the hot-pressed and flattened circumference on the base member, and FIG. 13C shows a step of treating peripheral surfaces of the tiling tatami panel.

DETAILED DESCRIPTION OF THE PREFERRED EMBODIMENTS

Preferred embodiments of the invention will now be explained below with reference to the drawings.

First Embodiment (FIGS. 1 through 7)

Figure 1:
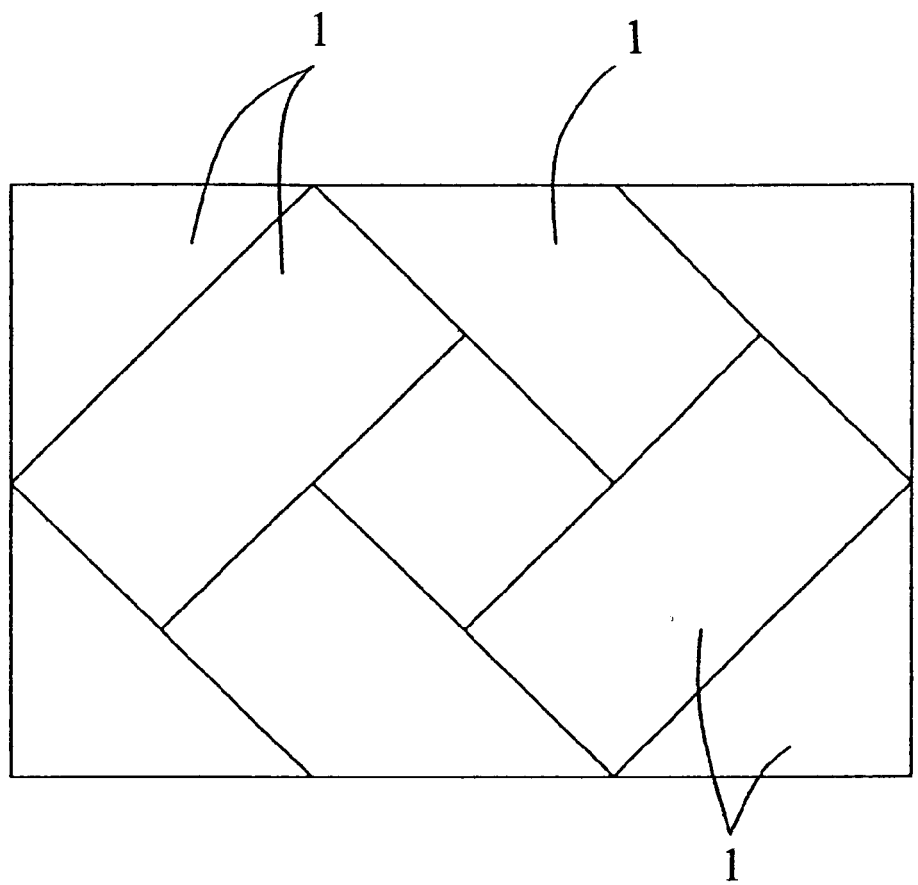
FIG. 1 is a plan view that shows a pattern of arrangement of stripless tatami mats according to the invention in use on a floor.

In FIG. 1, reference numeral 1 denotes a thin tatami mat not having edge-covering strips. The stripless thin tatami mat 1 is composed of a tatami facing 2 made of natural rushes, synthetic resin products or wooden fibers, and a mat bed 3, which are joined together with an adhesive 4. The mat bed 3 may include, as its major or sole component, resin foam, resin board or wooden board. Alternatively, it may include, as its major or sole component, a natural or synthetic rubber board. Combinations of these materials are also acceptable.

The mat bed 3 may have a multi-layered structure including, for example, a wooden board W and rubber G (FIG. 6) bonded to the bottom surface of the wooden board W. As an alternative, the mat bed 3 may have a multi-layered structure including a main layer of natural or synthetic rubber and a top layer made thereon of composite foam of calcium carbonate and polyethylene or polyolefin, or felt. As another alternative, the mat bed 3 may have a multi-layered structure including an additional intermediate layer of wooden board between the main layer of natural or synthetic rubber and the top layer made thereon of composite foam of calcium carbonate and polyethylene or polyolefin, or felt, with or without a rubber layer as the bottom layer. As another alternative, the mat abed 3 may have a single-layer structure made of composite foam of calcium carbonate and polyethylene or polyolefin. For the benefits of both a cushiony function and environmental protection, composite foam of calcium carbonate or polyolefin and felt are most desirable as materials of the mat bed 3. The composite foam does not generate toxic gas when incinerated, and the thin tatami mat 1 can be discarded after use without inviting serious environmental problems. From the viewpoint of preventing the thin tatami mat 1 from warpage, it is recommended to add the rubber layer under the layer of composite foam of calcium carbonate and polyolefin, or felt.

Most desirably, the stripless thin tatami mat 1 uses a facing 2 of natural rushes treated by hot pressing. If the facing 2 is pressed before being boded to the mat bed 3, it will remove creases and irregularities in the texture, and thin tatami mats will be stabilized in quality. Especially in case of a facing.2 using natural rushes, hot pressing helps extruding chlorophyll from inside the natural rushes, and contributes to remove or reduce irregularities in color which are inevitably produced in the process of dyeing.

As the material of the facing 2, short natural rushes can be used by splicing a plurality of such rushes midway. In general, the facing 2 is made of full-length rushes each having a length enough to extend the full width of the facing 2, and the part of a rush usable for making a tatami mat is limited to its length excluding the head and the root. In other words, rushes are used by cutting away of their heads and roots. Therefore, commercially valuable rushes are actually limited to those longer than one meter, taking account of the standard width of tatami mats, namely, about 900 mm or 880 mm, and shorter rushes have been discarded as being useless.

In high-quality tatami mats, the facing is made by using the best portion of each rush longer than one meter and splicing two such best portions to make up the full width of the facing. Using this splicing technique, and using short rushes that will be discarded as being useless, the facing 2 of the thin tatami mat 1 according to the invention is preferably made by splicing two or three short rushes to obtain a length not smaller than the full width of the facing 2.

The facing 2 is preferably bonded to the top surface of the mat bed 3 over the entire area thereof, with an adhesive 4 applied to spaced portions in form of stripes in intervals of, for example, 10 mm. Usable as the adhesive 4 is any commercially available adhesive having an appropriate durability. However, a hot-melt adhesive is preferably employed, and a heat-resistant hot-melt agent is more preferably used, because they do not generate toxic substance such as formaldehyde and have a flexibility and a high adhesive force. By hot-pressing the facing 2 explained above, the facing 2 can be readily bonded adequately to the mat bed 3, and the stripless thin tatami mat 1 made in this manner is improved in flatness.

Figure 2:
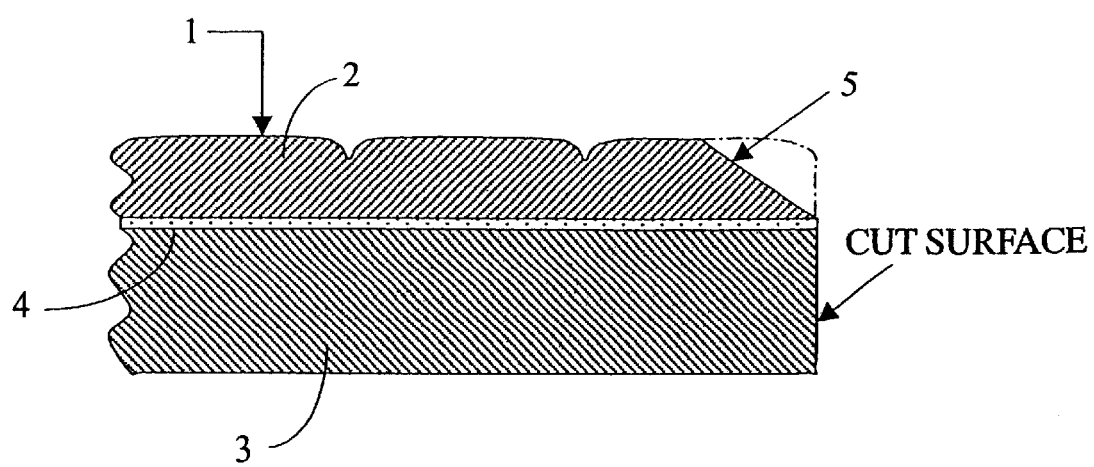
FIG. 2 is a fragmentary cross-sectional view to explain chamfering of a border of the facing of a stripless tatami mat according to the invention.
Figure 3:
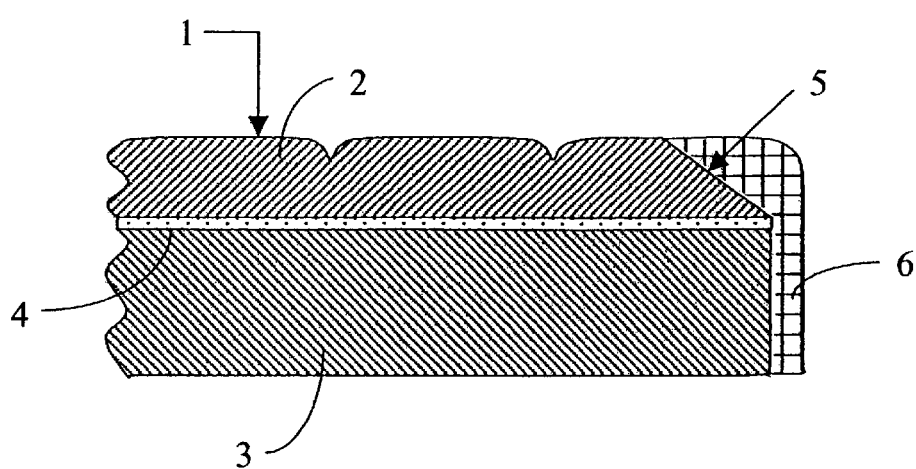
FIG. 3 is a fragmentary cross-sectional view showing a border portion of a strapless tatami mat according to the invention.
Figure 4:
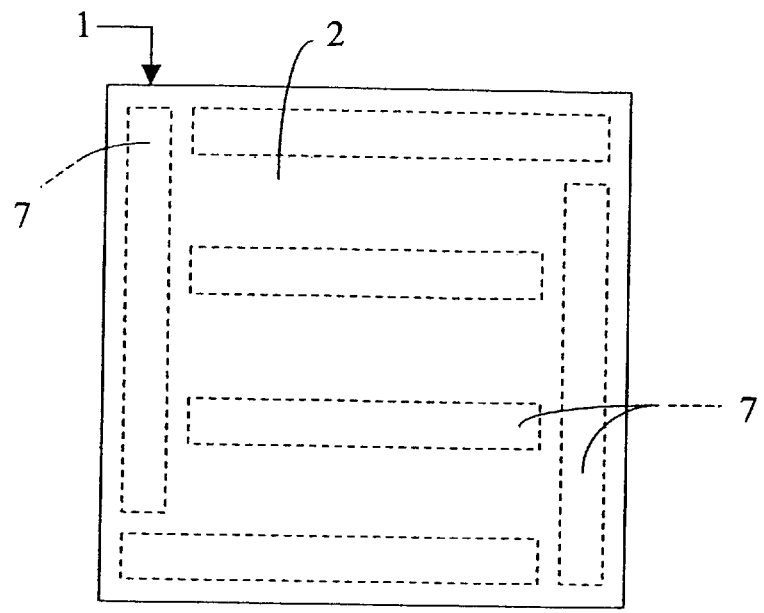
FIG. 4 is a plan view of a stripless tatami mat for explaining a layout of double-faced adhesive tapes on the bottom face of a strapless tatami mat according to the invention.
Figure 7:
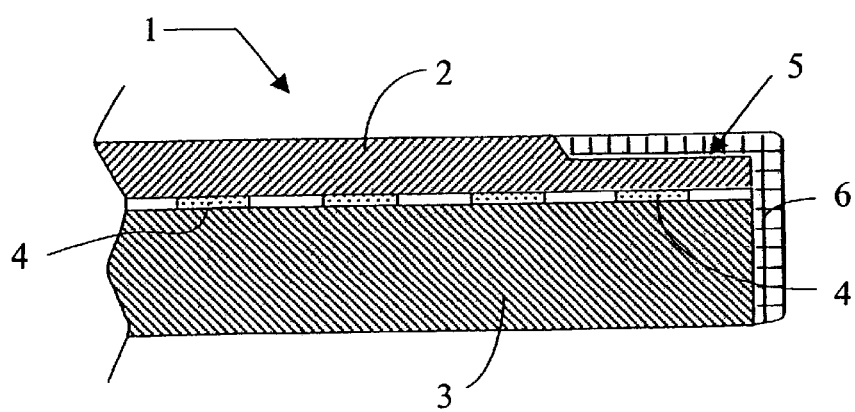
FIG. 7 is a fragmentary cross-sectional view to explain hot pressing of a border portion of a facing of a stripless tatami mat according to the invention.

After the facing 2 is bonded onto the mat bed 3, the strapless thin tatami mat 1 is preferably treated by means of preventing borders of the facing 2 from any disorder or deformation such as loosening, fraying, raveling, fluffing or exfoliation of its borders. As one of such means, borders of the facing 2 are chamfered throughout the entire circumference thereof (FIG. 2). As an alternative, border portions of the facing 2 may be flattened by hot pressing (FIG. 7). After treatment of the border portions 5, a protective film 6 is formed to cover at least border portions 5 of the facing 2. The protective film 6 may extend to the peripheral surfaces of thin tatami mat 1 (peripheral surfaces of the mat bed 3). The protective film 6 intrudes into a certain depth of the facing 2 and the mat bed 3 and then cures, but it maintains an appropriate flexibility even after it cures. For example, natural rubber and latex resin meet these requirements. The stripless thin tatami mat 1 is improved in appearance when set on a floor by chamfering or pressing borders of the facing 2. Additionally, by covering border portions 5 of the stripless thin tatami mat 1 with the protective film 6, the facing 2 can be prevented from any disorder or deformation of borders. As another alternative of the means for preventing the facing 2 from disorder or deformation of borders, transparent or colored adhesive tape may be prepared and attached onto border portions 5 of the facing 2 and peripheral surfaces of the mat bed 3 involved.

A process of manufacturing the thin film 1 according to the invention is shown below.

(1) The adhesive 4 is applied on the entire surface of the mat bed 3;
(2) the facing 2 is bonded onto the mat bed 3;
(3) the integral of the facing 2 and the mat bed 3 is cut to a standard traditional full or half mat size, or a size determined by precisely measuring the area of a floor to set tatami mats on and calculating a precise size of each tatami mat;
(4) the entire circumferential border portions 5 of each facing 2 are chamfered or hot-pressed; and
(5) an adhesive resin such as latex resin is applied at least to the border portions 5 of the facing 2 to form the protective film 6.

It will be understood from the above-explained manufacturing process that any one other than tatami craftsmen can also make the thin tatami mat 1 according to the invention. Additionally, since the process needs much less steps than the process for making a conventional tatami mat, the invention can reduce the manufacturing cost and can provide an inexpensive thin tatami mat 1.

FIG. 1 illustrates an example of using stripless thin tatami mats 1 according to the invention, which can provide an unpredictable combination of weave texture of the facings 2 and geometrical pattern. In this example, the precise area of the floor to set tatami mats on is first measured, sizes and shaped of individual tatami mats are determined by calculation from the measured data, and individual stripless thin tatami mats 1 are manufactured and processed in accordance with their particular sizes and shapes. Of course, it is also possible to prepare standardized strapless thin tatami mats 1 by mass production and adequately cut the tatami mats 1 at the job site before actually setting them as shown in FIG. 1. Since the facing 2 is bonded to the mat bed 3 over the entire area thereof in the tatami mat 1 according to the invention, the tatami mat 1 can be cut anywhere in its entire area. Cut surfaces newly exposed by the cutting of the tatami mat 1 may be first chamfered along the borders of the facing 2 and thereafter coated with an appropriate adhesive resin material to form the protective film 6 thereon. Such a series of works can be attained even by any one other than tatami artisans. Therefore, even for arranging tatami mats in a particular pattern as shown in FIG. 1, there needs no tatami craftsman, and any amateur can deal with it sufficiently.

Stripless thin tatami mats 1 according to the invention can be made commercially available to ordinary people via a route different from conventional ones as explained below. For example, strip less thin tatami mats 1 having new standard sizes slightly larger than the traditional standard full (about 900 mm×180 mm or about 880 mm×176 mm) and half (about 900 mm×900 mm or about 880 mm×880 mm) can be manufactured by mass production, and can be sold to ordinary people such that the ordinary people can cut and adjust them to their desired shapes and sizes to set them on a part of the floor or a Western-style room, for example. In order to enable ordinary people to easily cut the tatami mats 1 upon setting tatami mats 1, the strapless thin tatami mat 1 according to the invention is preferably thin. Namely, the tatami mat 1 preferably has a thickness in the range from approximately 5 mm to 30 mm, more preferably in the range from about 5 mm to 25, more preferably in the range from about 5 mm to 20 mm, most preferably in the range from about 10 mm to 20 mm. Although those having a thickness around 30 mm have been called thin tatami mats in the field of tatami mats, it is advantageous to make the tatami mat thinner than conventional ones for the benefit of both the cost and the cutting work of the mat bed. When stripless thin tatami mats 1 are manufactured as thin tatami mats and are used to cover the floor of a Japanese-style room, thickness of the stripless thin tatami mats might be insufficient as compared with the height of the door sill. In this case, an adjustment board (not shown) having a complementary thickness can be spread beforehand on the floor, and strip less thin tatami mats 1 may be set on the adjusting board to align the top surface of the thin tatami mats flush with the top surface of the sill.

This job is also attained by do-it-yourself fans. More specifically, cut surfaces newly exposed by cutting the tatami mat 1 may be covered with the protective film 6 by coating an appropriate adhesive on chamfered border portions of the facing 2. If necessary, a set of an appropriate cutter and a resin material for making the protective film 6 may be sold together. If desired, after the stripless thin tatami mats 1 are laid in position on a floor, post-set strips as disclosed in Japanese Patent Laid-Open Publication No. 9(1997)-195485 may be added between outer-most borders of outer-most tatami mats and the sill.

The issue of warpage that may occur in stripless thin tatami mats 1 after set on a floor, in particular, the issue of warpage liable to occur in stripless thin tatami mats 1 manufactures as thin tatami mats, can be overcome by applying double-face adhesive tapes 7 covered by removable sheets (not shown) to appropriate positions on the bottom surface of each stripless thin tatami mat 1 before shipment from a factory, for example, such that users may remove the removable sheets and bond the stripless thin tatami mat 1 onto the floor where the mat 1 should be settled. The issue of warpage of thin tatami mats 1 can be dealt with by using a multi-layered structure as the mat bed 3 as already explained. For example, if the mat bed 3 includes an underlying rubber layer as mentioned before, the rubber layer not only adds a cushiony property to the tatami mat 1 but also helps preventing the tatami mat 1 from warpage. Especially when the tatami mat 1 is used in an environment likely to cause warpage, a layer of a material having a relatively small resiliency, such as vinyl chloride resin layer, may be stacked on the bottom surface of the mat bed 3.

Figure 5:
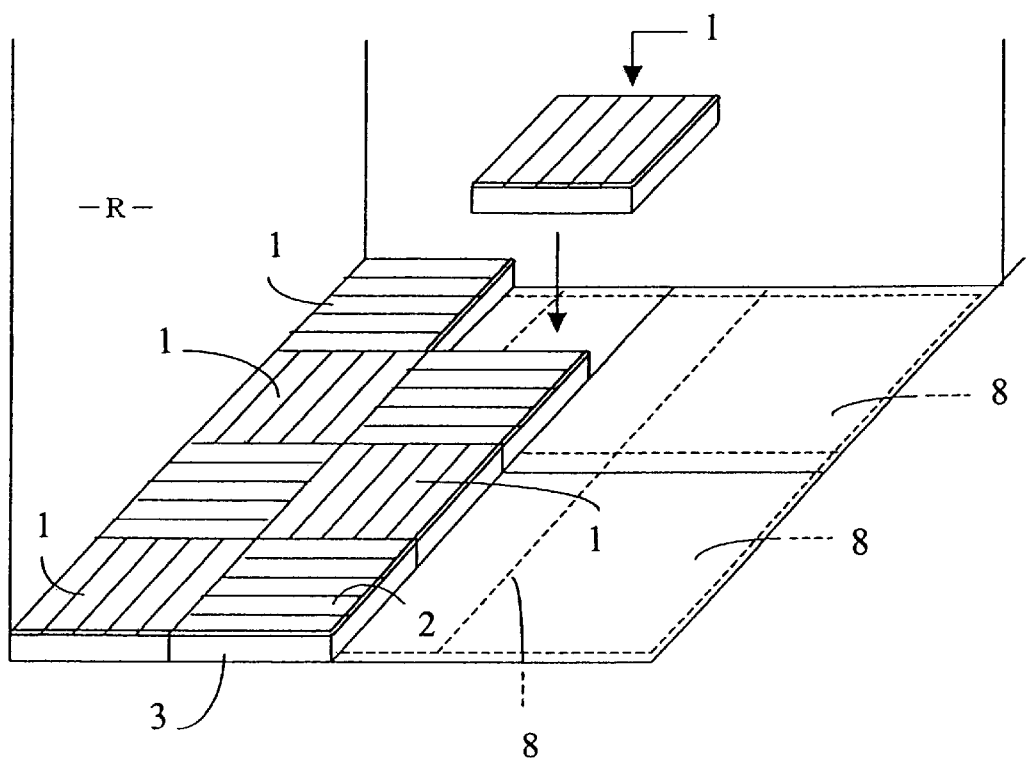
FIG. 5 is a diagram that shows fixture of stripless tatami mats on a care sheet spread on a floor of a room.
Figure 6:
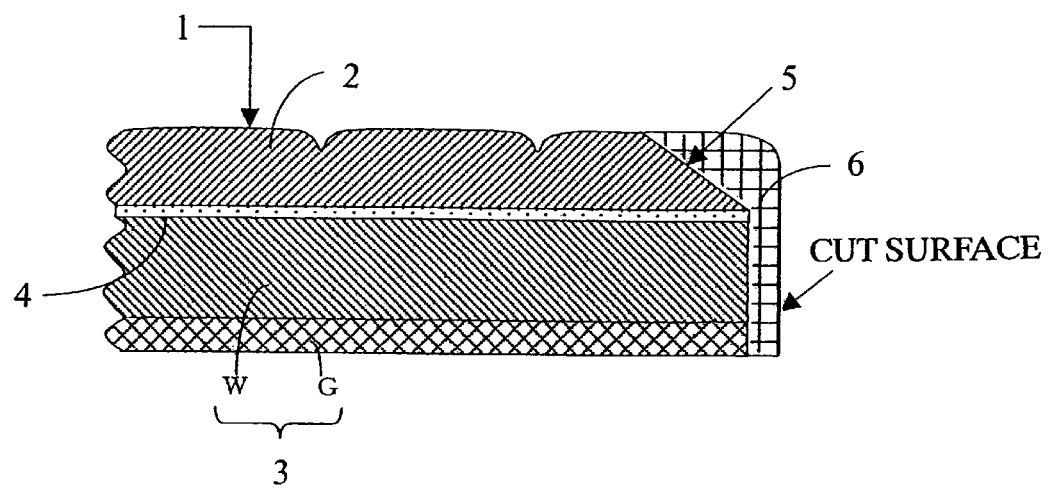
FIG. 6 is a fragmentary cross-sectional view of a strapless tatami mat according to the invention, in which the mat bed has a multi-layered structure.

The issue of warpage of the stripless thin tatami mat 1 can be overcome also by a particular mat setting technique. That is, before the tatami mats 1 are set on a floor, a plurality of care sheets 8 may be spread, partly overlapping with each other, on the floor of a room R as shown in FIG. 5, to fix the stripless thin tatami mats 1 thereon with double-face adhesive tapes (not shown). This effectively prevent warpage without damaging the floor. Therefore, in case the flooring of a Western-style room is entirely or partly re-paved with tatami mats 1, since the tatami mats 1 are not fixed directly to the original flooring, even after the tatami mats 1 are removed for the purpose of renewal of the room, for example, no problem will remain for restoring the room R.

Second Embodiment (FIGS. 8 through 11)

Figure 8:
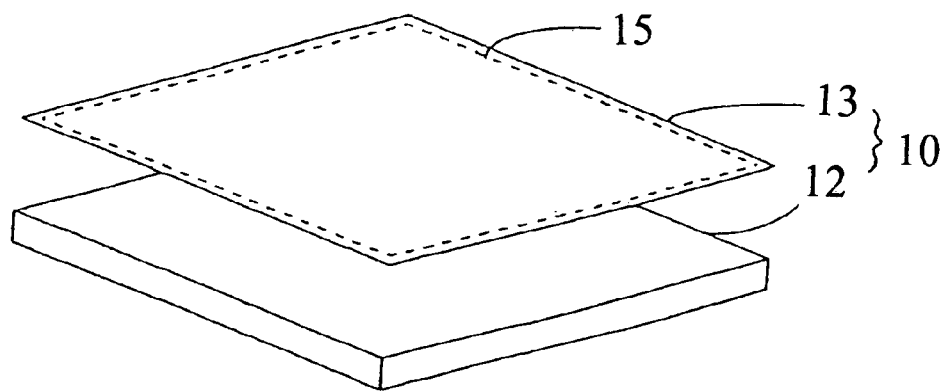
FIG. 8 is an exploded perspective view of a tiling tatami panel according to the second embodiment of the invention.

In FIG. 8, reference numeral 10 denotes a tiling tatami panel according to the second embodiment of the invention. The tiling tatami panel 10 is composed of a base member 12 easy to cut, and a tatami facing 13 overlying the base material 12. For use in tiling a floor, the tiling tatami panel 10 preferably has a size smaller than that of tatami mats of use in Japanese-style rooms, namely, a square with a length of each side being in the range from 300 mm to 750 mm, and more preferably a square with a length of each side being around 500 mm. Thickness of the tiling tatami panel 1 is preferably in the range from 5 mm to 20 mm, more preferably in the range from 5 mm to 18 mm, and most preferably in the range from 6 mm to 12 mm.

The facing 13 is made of natural rushes, imitation rushed of a synthetic resin, or wooden fibers. When using natural rushes, short rushes can be used by splicing a plurality of such rushes midway to totally span the full width of the facing 13.

When the facing 13 is made of natural rushes, if the length of each side of the tiling tatami panel 10 is 500 mm, relatively short rushes heretofore discarded as being useless can be also used. Additionally, if natural rushes are used by splicing them midway, significantly short rushes heretofore disregarded can be also used. Therefore, by reducing the size of the tiling tatami panel 10 smaller than approximately 880 mm or 955 mm both are widths of traditional tatami mats, the a cost of purchasing rushes can be saved significantly.

In case of using natural rushes, the facing 13 is preferably treated by hot pressing to stabilize its quality.

Figure 9:
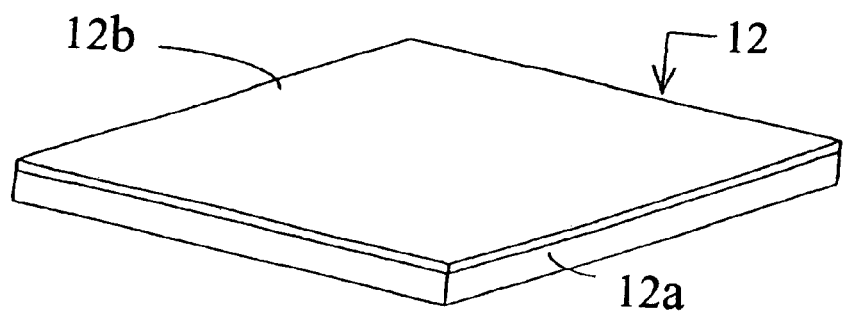
FIG. 9 is a perspective view of a base member of a tiling tatami panel according to the invention.
Figure 10:
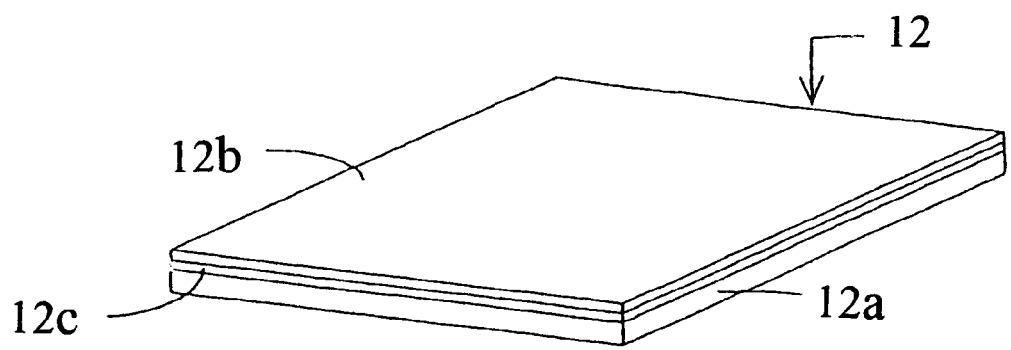
FIG. 10 is a perspective view of an alternative base member of a tiling tatami panel according to the invention.

The base material 12 may be made by using, as its major component, a relatively hard board. However, a board of natural rubber of synthetic rubber is more preferable as the major component of the base member 12. Additionally, these boards may be combined with felt stacked thereon. FIG. 9 shows a specific structure of the base member 12. The base member 12 shown here has a structure stacking a main layer 12a made of natural or synthetic rubber and an upper layer 12b made of composite foam of calcium carbonate and polyethylene or polyolefin, or felt. FIG. 10 shows another specific structure of the base member 12. The base member 12 shown here has a structure interposing an intermediate layer 12c in form of a wooden board between the main layer 12a of natural or synthetic rubber and the upper layer 12b of composite foam of calcium carbonate and polyethylene.

By interposing the upper layer 12b of composite foam of calcium carbonate and polyethylene or polyolefin, or felt, between the main layer 12a and the facing 13 as explained above, an adequate cushiony property is given to the tiling tatami panel 10. Especially when composite foam of calcium carbonate and polyethylene or polyolefin is employed as the upper layer 12b, it has been confirmed that users can get an impression of a typical tatami mat made of natural materials when he/she treads on the tiling tatami panel 10.

In case the tiling tatami panel 10 is finished relatively as thin as 6 through 12 mm, approximately, the base member 12 may comprise a single layer of composite foam of calcium carbonate and polyethylene or polyolefin, or felt, and warpage of the tiling tatami panel 10 can be prevented by depositing on that layer a rubber layer or a vinyl chloride-based resin, for example, having a relatively small elasticity. Since composite foam of calcium carbonate and polyolefin does not generate toxic gas when incinerated, this is preferably selected as the base member 12 from the standpoint of environmental protection.

Figure 11:
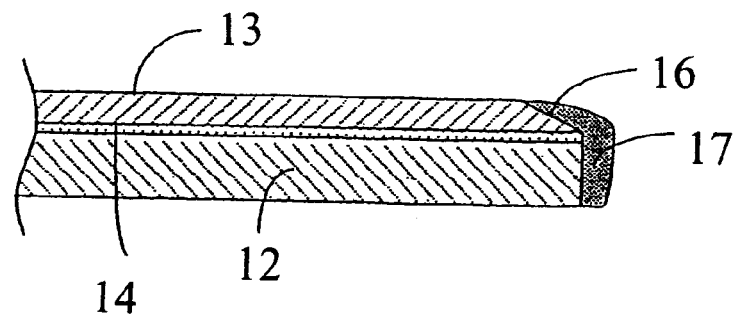
FIG. 11 is a cross-sectional view of a border portion of a tiling tatami panel according to the invention, in which border portions of the facing have been chamfered, as a way of edge treatment of the facing.

As shown in FIG. 11, the base member 12 and the facing 13 are bonded together with an adhesive 14. The adhesive 14 may be applied on the area of the base member 12 and/or the facing 13. Alternatively, it may be applied in form of spaced-apart stripes in intervals of, for example, about 1 cm, or may be applied only along the line 15 close to the borders (FIG. 8). Alternatively, the adhesive 14 may be applied continuously along the line 15 close to the borders and also to the central area in form of spaced-apart stripes in intervals of approximately 1 cm. Usable as the adhesive 14 is any commercially available adhesive having an appropriate durability. However, a hot-melt adhesive is preferably employed, and a heat-resistant hot-melt agent is more preferably used, because they do not generate toxic substance such as formaldehyde and have a flexibility and a high adhesive force.

After the facing 13 is bonded to the base member 12, the tiling tatami panel 10 is preferably treated by means of stabilizing the borders of the facing 13. As one exemplary means for this purpose, transparent or colored adhesive tape may be prepared and attached to cover the border portions of the facing and peripheral surfaces of the base member 12 involved. As an alternative, border portions of the facing 13 may be chamfered, and the chamfered portions 16 may be coated with an adhesive resin to form a protective film 17. It is effective to coat an adhesive resin over the chamfered portions 16 and peripheral surfaces of the base member 12 such that the protective film 17 cover the border portions of the facing 13 and peripheral surfaces of the base member 12 involved. The protective film 17 is preferably natural rubber or latex resin, which intrudes into the facing to a certain extent and then cures, and also maintains an appropriate flexibility. Chamfering the borders of the facing 13 improves the appearance of tiling tatami panels 10 when set in position. Further, by covering the peripheral surfaces of the tiling tatami panel 10 with the protective film 17, the facing 13 can be prevented from disorder or deformation of borders.

Chamfering 16 has been explained as means for stabilizing borders of the facing 13, in addition to the chamfering 16, or in lieu of the chamfering 16, hot pressing, which will be explained later (FIGS. 13A through 13C), may be conducted to flatten circumferential portions of the facing 13 and thereafter make the protective film 17 that covers only the flattened portions, or the flattened portions and peripheral surfaces of the base member 12 together.

The tiling tatami panels 10 according to the invention can be arranged on a floor similarly to various conventional tiling floor materials to make up a sophisticated floor with which users can enjoy the natural taste of tatami facing and parallel/vertical alignment of weaves of the facings. The tiling tatami panels 10 maybe set on a floor by merely arranging them in the entire area of a floor without bonding them to the original floor, or may be bonded to the original floor. If the tiling tatami panels are fixed on the floor by bonding, it if preferable to apply an adhesive on the bottom surface of the tiling tatami panel 10 before hand for speeding up the setting work. In this case, it will be convenient to coat the bottom surface of the tiling tatami panel 10 with an adhesive and cover the adhesive with a removable sheet such that the tiling tatami panel 10 can be bonded easily by merely removing the removal sheet at the job site. The adhesive may be coated only to selected portions of the bottom surface of the tiling tatami panel 10, or may be coated over the entire bottom surface of the tiling tatami panel 10.

If one or more of tiling tatami panels 10 has to be cut at the job site, the tatami panel 10 may be cut in the following manner.

(1) In case the facing 13 is bonded to the base member 12 with an adhesive applied in form of stripes over the entire area, after the tatami panel 10 is cut, the new border of the facing 13 is re-chamfered, and an adhesive (such as instantaneous adhesive) is coated on the chamfered surface to form the protective film 17.

(2) In case the facing 13 is bonded to the base member 12 only along the circumferential portion, an adhesive (preferably, instantaneous adhesive) is coated along the line to be cut before the tatami panel 10 is actually cut, such that the cut-line portion of the facing 13 is fixed to the base member 12. Thereafter, the tatami panel 10 is actually cut. After completion of the cutting job, the new border of the facing 13 is chamfered, if necessary, and an adhesive (for example, instantaneous adhesive) is coated there to form the protective film 17 on the cut surface of the tatami panel 10.

Since those jobs do not require particular skills, the tiling tatami mats according to the invention can be commercially distributed to ordinary people as one of "Do-it-yourself" products. Although the tiling tatami panel has been explained as being used for flooring, it is also usable as a wall covering panel or a wall hanging for partly decorating a wall. It is also usable to cover a ceiling. If it is used as a surface material of, for example, of a piece of furniture, or in those and other various modes of use, weaves of the facing 13 will be visually enjoyed. Depending on the purpose of use, it is possible to determine whether natural rushes, synthetic rushes or wooden fibers are used as the material of the facing 13 of the tiling tatami panel 10. Material, thickness of the base member 12 and size of the tatami panel 10 can be also determined similarly.

Third Embodiment (FIG. 12 and FIGS. 13A through 13C)

FIG. 12 and FIGS. 13A through 13C show a tiling tatami panel according to the third embodiment of the invention. In the explanation of the third embodiment given below, the same components as those of the second embodiment are labeled with common reference numerals, and their explanation will be omitted, where appropriate. Thus the following explanation is substantially directed only to particular features of the third embodiment.

Figure 12:
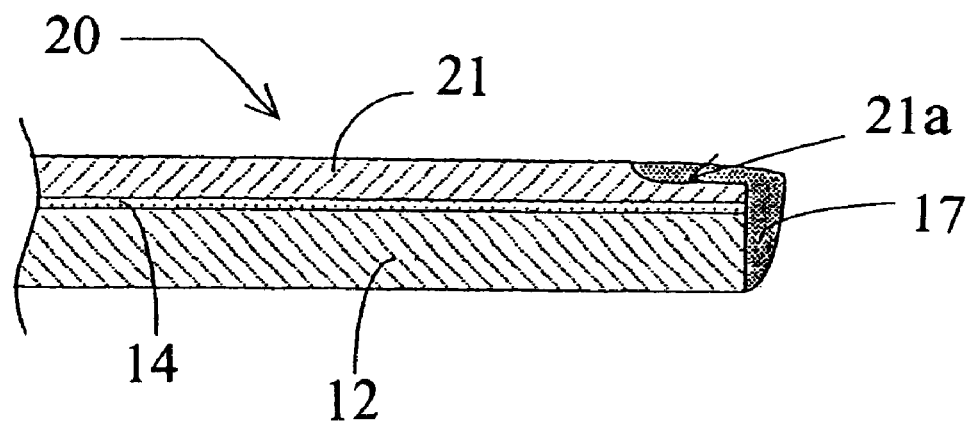
FIG. 12 is a cross-sectional view of a border portion of a tiling tatami panel according to the invention, in which border portions of the facing have been treated by hot pressing as an alternative way of edge treatment of the facing.

In FIG. 12, reference numeral 20 denotes a tiling tatami panel according to the third embodiment of the invention. The tatami facing 21 of the tiling tatami panel 20 is treated by whipstitching along the circumferential borders 21a thereof. The whipstitching is a known technique as a method of processing loose borders of a straw mat, and it is not explained here in detail. In the tiling tatami panel 20 according to the third embodiment, border portions 21a of the facing 21 are preferably treated by hot pressing (FIG. 13A) the base member 12. However, the hot pressing is not indispensable for the tiling tatami panel 21 shown here.

Figure 13A:
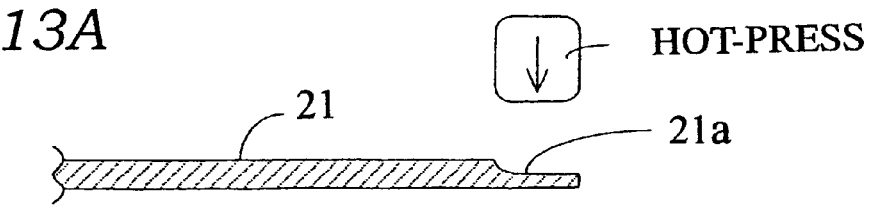
Figure 13B:
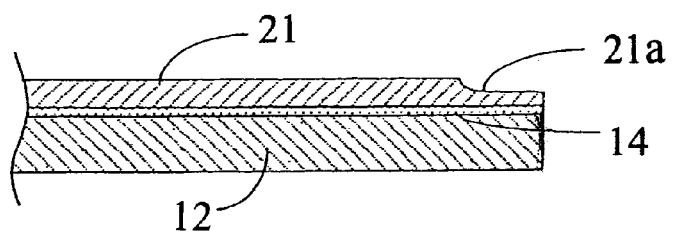
Figure 13C:
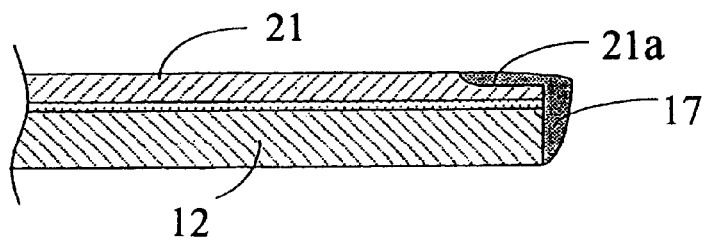

The tiling tatami panel 20 can be made in the following manner (FIGS. 13A through 13C).

(1) Although not indispensable, border portions 21a of the facing 21 are hot-pressed and flattened (FIG. 13A).

(2) An adhesive 14 is coated on the top surface of the base member 12 or the back surface of the facing 21 in form of spaced-apart stripes over the entire surface thereof or in form of line close to the circumferential borders thereof to bond the base member 12 and the facing 21 together (FIG. 13B).

(3) Although not indispensable, a protective material 17 is coated at least to circumferential border portions of the facing 21, or to circumferential border portions of the facing 21 and peripheral surfaces of the base member 12 to form a protective film (FIG. 13C).

If one or more of tiling tatami mats 20 has to be cut at the job site, it may be cut in the following manner similarly to that used for the tiling tatami panel 10 according to the second embodiment.

(1) In case the facing 21 is bonded to the base member 12 with an adhesive applied in form of stripes over the entire area, after the tatami panel 20 is cut, the new border of the facing 21 is re-chamfered, and an adhesive (such as instantaneous adhesive) is coated on the chamfered surface to form the protective film 17.

(2) In case the facing 21 is bonded to the base member 12 only along the circumferential portion, an adhesive (preferably, instantaneous adhesive) is coated along the line to be cut before the tatami panel 20 is actually cut, such that the cut-line portion of the facing 21 is fixed to the base member 12. Thereafter, the tatami panel 20 is actually cut. After completion of the cutting job, the new border of the facing 13 is chamfered, and an adhesive (for example, instantaneous adhesive) is coated there to form the protective film 17 on the cut surface of the tatami panel 20.

Although the tiling tatami panel according to the invention has been explained as being used for flooring, it is also usable as a wall covering panel or a wall hanging for partly decorating a wall. It is also usable to entirely or partly cover a ceiling of a room. Furthermore, by selecting a material excellent in sound absorption as the material of the base member 12, the tiling tatami panel according to the invention can be used as a sound absorbing material on walls and/or ceilings.

What is claimed is:

1. A thin tatami mat comprising:

a mat bed;

a facing equal in size to said mat bed, said facing having a chamfer along a border and said facing being bonded to the top surface of said mat bed; and an edge stabilizing means for stabilizing borders of said facing from deformation, said edge stabilizing means including a protective film which covers said chamfer.

2. A thin tatami mat according to claim 1, wherein said mat bed comprises a felt or a composite foam made of calcium carbonate and one of polyethylene and polyolefin.

3. A thin tatami mat according to claim 1 wherein said mat bed includes a rubber layer or resin layer having a small elasticity to form a bottom layer of said mat bed.

4. A thin tatami mat comprising:

a mat bed;

a facing equal in size to said mat bed, said facing including a reduced thickness-portion along a border, and said facing being bonded to a top surface of said mat bed; and an edge stabilizing means for stabilizing borders of said facing from deformation thereof, said edge stabilizing means including a protective film coating said reduced thickness portion.

5. A thin tatami mat according to claim 4, wherein said mat bed is made of felt or a composite foam comprising calcium carbonate and one of polyethylene and polyolefin.

6. A thin tatami mat comprising:

a mat bed having a layer of composite foam made of calcium carbonate and polyolefin;

a facing bonded to one surface of said mat bed and said facing having at least one of a chamfer and a reduced thickness portion along a border of said facing; and a protective film made of natural rubber or latex resin coating at least one of the chamfer and the reduced thickness portion.

7. A thin tatami mat, comprising:

a mat bed;

a facing equal in size to said mat bed and bonded to one surface of said mat bed, said mat bed including a rubber layer or a resin layer having a small elasticity; and a protective film of resin coating a border of said facing; and wherein said facing has A chamfer along the border.

8. A thin tatami mat, comprising:

a mat bed;

a facing equal in size to said mat bed and bonded to one surface of said mat bed, said mat bed including a rubber layer or a resin layer having a small elasticity; and a protective film of resin coating a border of said facing; and wherein said facing has a reduced thickness portion along the border.

9. A tiling tatami panel comprising:

a base member;

a facing equal in size to said base member, said facing having a chamfer along a border and said facing being bonded to a top surface of said base member; and an edge stabilizing means for stabilizing the border of said facing from deformation, said edge stabilizing means including a protective film which covers said chamfer.

10. A tiling tatami panel according to claim 9, further comprising a rubber layer or a layer of resin material having a small elasticity at the bottom of said base member.

11. A tiling tatami panel comprising:

a base member;

a facing being equal in size to said base member and having a reduced thickness portion along a border, and said facing being bonded to a top surface of said base member, and an edge stabilizing means for stabilizing borders of said facing from deformation, said edge stabilizing means including a protective film which covers said reduced thickness portion.

* * * * *